Feb. 10, 1970     C. G. RAMSEY     3,494,237
SHEAR MECHANISM
Filed Feb. 1, 1967
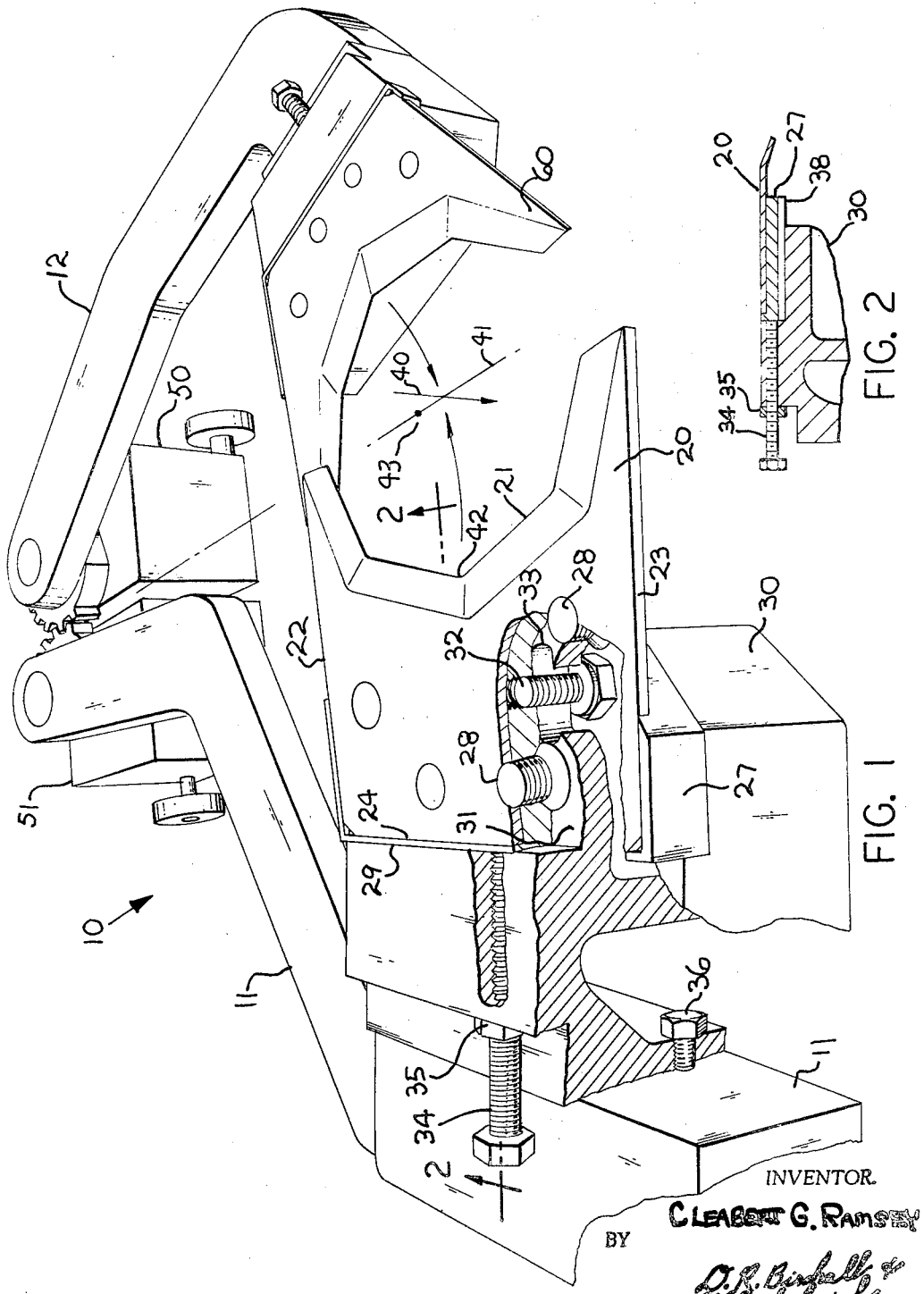
INVENTOR.
CLEABERT G. RAMSEY
BY United States Patent Office 3,494,237
Patented Feb. 10, 1970

3,494,237
SHEAR MECHANISM
Cleabert G. Ramsey, Columbus, Ohio, assignor to Owens-Illinois, Inc., a corporation of Ohio
Filed Feb. 1, 1967, Ser. No. 613,353
Int. Cl. B26d 1/04
U.S. Cl. 83—694                         3 Claims

ABSTRACT OF THE DISCLOSURE

A shear mechanism for severing suitable lengths of glass from a stream of molten glass that gravitates therethrough. Adjustable blades associated with the shear mechanism.

---

This invention relates to glass making and in particular it relates to adjustable shear blades for severing mold charges from a stream of molten glass that is being fed downwardly by a glass feed or other source of supply.

In feeding molten glass charges to a forming machine for the manufacture of glass articles such as, for example, the faceplate portion of a cathode ray tube, it is necessary to shear successive charges or gobs from a stream of molten glass issuing from a feeder orifice situated on the underside of a glass furnace forehearth. While it is common to shear glass gobs from a mass of glass that has gravitated from an overhead orifice, it is conceivable that glass gobs could be severed as a continuous stream of glass is drawn from a pool by suction.

It is customary to carry out the glass-severing step in an intermittently fed process by using a pair of juxtaposed cutter blades that are driven into and out of shearing relationship by mechanical, pneumatic or hydraulic mechanisms. Because the molten glass is in the order of 1800–2400° F., the shear blades operate at high temperatures which are detrimental to the preservation of the hardness of the steel. Consequently, the sharpness of the cutting edges of the shear blades is diminished so that the shear blades must be very frequently removed from the shear mechanism for sharpening. The repeated sharpening of the shear blades removes some of the steel thus reducing the overall size or length of the shear blade. The reduced size of the shear blades affects the exact point of closing, as will be set forth in greater detail elsewhere. When the shear blades do not meet at the optimum point of closure, a shear history mark is left on the gob of glass which causes a defect in the finished glass article thus causing it to be rejected. Also, if the shearing is not complete because of misaligned shear blades, threads of glass may be formed which will also cause a defective optical part, such as the viewing portion of a television faceplate.

Accordingly, this invention is intended to overcome the problems involved in shearing the molten glass to provide a glass article of consistent optical excellence.

The primary object of the present invention is to provide an adjustability feature to a shear mechanism so that it will always strike at the same position regardless of the amount of blade shortening caused by repeated sharpening.

An object of the present invention is to eliminate protuberances above the surface of the shear blade thus permitting them to work closer to the orifice from which the molten glass exits.

Another object of the present invention is to eliminate the necessity of making shear adjustments during the operation of the shear mechanism.

A further object of the present invention is to sever a glass gob that is symmetrical and without irregular ends.

Another object of this invention is to simplify the mechanism that controls the reciprocating motion of the shear blades.

An additional object of the instant invention is to effect a saving in time required for set-up and sharpening of the shear blades.

In the drawings:

FIG. 1 is a perspective vew partly broken away and in section which shows the shear mechanism, and FIG. 2 is a cross-sectional view taken along the line 2—2 of FIG. 1.

Referring to the drawings, a reciprocatable shear mechanism 10 is shown in a horizontal attitude similar to that employed during actual use with a glass furnace forehearth feeder or other molten glass dispensing apparatus (not shown). The shear mechanism 10 is comprised of two juxtaposed cantilevered arms 11 and 12, which are powered so that their free ends will move together and away from each other in unison. Attached to the free ends of cantilevered arms 11 and 12 are shear blades 20 and 60. The cutting edges 21 and 61 of the shear blades pass across each other to produce the shearing action necessary in severing individual gobs or charge of glass.

The apparatus which constitutes the present invention will now be described in more detail. Shear blade 20 is fabricated from a relatively thin plate of high speed steel specially alloyed so that it will retain its cutting edge under extremely hot environmental working conditions. Since shear blades 20 and 60 are essentially the same, except for being opposite hand, only shear blade 20 will be described in detail. The leading edge 21 of blade 20 is contoured and beveled so that a sharp edge results thereon. The sides 22 and 23 taper toward each other as they progress away from the leading edge 21 and intersect back side 24. Shear blade 20 is mounted on and attached to carrier plate 27 by bolts 28. The heads of bolts 28 fit into countersunk holes in the bottom of carrier plate 27. The threaded shanks of bolts 28 pass up through their corresponding holes in carrier plate 27 and are threadedly engaged with tapped holes in shear blade 20. The bolts 28 do not, however, protrude above the surface of shear blade 20. Thus shear blade 20 can be moved quite close to the orifice from which the molten glass is drawn. To further aid in immobilizing shear blade 20 and carrier blade 27, side surfaces 22, 23 and back surface 24 are positioned against the inside surface of an upstanding peripheral flange 29.

Carrier plate 27 is, in turn, adjustably attached to support bracket 30. The bottom of carrier plate 27 is planar except for an integral key which will be described elsewhere. The planar bottom side of carrier plate 27 rests upon equally planar surface 31 of support bracket 30. Bolts 32 extend in an upward direction through elongated holes 33 and firmly engage tapped holes in carrier plate 27. Abutting against the back edge of carrier plate 27 is an adjustment screw 34 which is threadedly engaged with a tapped hole in the support bracket 30. A locknut 35 is positioned on adjustment screw 34 so that screw 34 can be locked against rotation. Support bracket 30 is attached to arm 11 of shear mechanism 10 by means of bolts 36.

In FIG. 2, which is a cross-sectional view taken along line 2—2 of FIG. 1, a key 38 is shown on the bottom of carrier plate 27. Key 38 fits into a complementary groove in surface 31 of support bracket 30. Thus it can be readily seen that carrier plate 27 can move linearly with respect to support bracket 30.

During the operation of shear mechanism 10, molten glass passes through the open shears along a line which represents the center line of the orifice located above and which is depicted by arrow 40. As can be seen in FIG. 1 of the drawings, arrow 40 passes perpendicularly through a line 41 which bisects the scissors action of the shear blades. It is important that the most reentrant portion 42 of the leading edge 21 of blade 20 meet the corresponding location of opposing blade 60 exactly at line 40. The above set forth condition can be met when the shear blades are new. As the shear blades are sharpened, they will no longer meet at line 40. In prior art shear mechanisms, elaborate compensating devices such as represented in block form at 50 and 51 were installed to adjust the stroke of arm 11 and arm 12. Such adjustment, even though successfully provided by compensating devices 50 and 51, would not permit reentrant portion 42 of blade 20 to meet its counterpart reentrant portion of the opposing shear blade at the line 40. Instead, the meeting of the blades would occur at a point designated by 43. When the shear blades do not close exactly in symmetrical relationship with respect to the perpendicular axis that passes through the orifice of the forehearth feeder, the glass gob will retain a shear history mark that follows it into the mold and ultimately results in a defective part, or one having diminished optical clarity.

In order to overcome the shortening of the shear blades because of repeated wear and sharpening, the shear blades can be extended to their original or new position by the adjustability feature of the present invention. In making an adjustment, bolts 32 are loosened thus permitting carrier plate 27 to slide forward in slotted holes 33 of support bracket 30. The exact forward movement of carrier plate 27 and blade 20 anchored thereto can be controlled be advancing adjustment screw 34. Locknut 35 can then be used to prevent further turning of adjustment screw 34. Carrier plate 27 will move forward in a straight line because it is guided by the key 38 which is positioned on its bottom side and which is in sliding engagement with a groove in surface 31 of support bracket 30.

In production, the entire blade assembly including support bracket 30, carrier plate 27 and shear blade 20 can be detached from arm 11 so that leading edge 21 of blade 20 may be resharpened. The adjustment heretofore described can be made by a bench check fixture in order to compensate for the metal removed as a result of the sharpening process. The blade assembly can be returned to its original position on the shear mechanism with assurance that it will meet and sever glass gobs in a symmetrical fashion.

The presently set forth concept is quite advantageous in that an expensive compensating mechanism such as that represented by 50 and 51 can be eliminated. Then too, adjustments need not be made to the shears in the heat environment which is inherent with the severing of glass charges or gobs.

While certain representative embodiments and details have been shown for the purpose of illustrating the invention, it will be apparent to those skilled in this art that various changes and modifications may be made therein without departing from the spirit or scope of the invention.

What is claimed is:

1. In combination with a shear mechanism for severing mold charges from a supply source of molten glass, a shear blade assembly for coacting with a similar juxtaposed mating blade having a cutting edge at one end, said shear blade assembly including a plurality of shear arms pivotably mounted so that their cantilevered ends can move with respect to each other, each of said arms having shear blade support means mounted on said cantilevered end, a shear blade carrier plate slidably attached to said support means and keyed with respect to said support means to prevent relative rotation therebetween during adjustment, a shear blade attached to said carrier plate, and an adjustment mechanism associated with each blade for horizontally adjusting the position of the cutting edge to compensate for the material removed from said blades during sharpening.

2. In combination with a shear mechanism for severing mold charges from a supply source of molten glass, a shear blade assembly for coacting with a similar juxtaposed mating blade having a cutting edge at one end, said shear blade assembly including a plurality of shear arms pivotably mounted so that their cantilever ends can move with respect to each other, each of said arms having shear blade support means mounted on said cantilevered end, a shear blade carrier plate slidably attached to said support means, a shear blade attached to said carrier plate wherein the sides of said shear blade abut the surface of a flanged portion of said carrier plate, and an adjustment mechanism associated with each blade for horizontally adjusting the position of the cutting edge to compensate for the material removed from said blades during sharpening.

3. In combination with a shear mechanism for severing mold charges from a supply source of molten glass, a shear blade assembly for coacting with a similar juxtaposed mating blade having a cutting edge at one end, said shear blade assembly including a plurality of shear arms pivotably mounted so that their cantilevered ends can move with respect to each other, each of said arms having shear blade support means mounted on said cantilevered end, a shear blade carrier plate slidably attached to said support means, a shear blade attached to said carrier plate, and an adjustment mechanism associated with each blade for horizontally adjusting the position of the cutting edge to compensate for the material removed from said blades during sharpening wherein said adjustment means is positioned within said support means to urge said shear blade carrier plate in a direction away from said shear arm.

References Cited

UNITED STATES PATENTS

| | | | |
|---|---|---|---|
| 1,176,392 | 3/1916 | Miller | 83—694 |
| 1,326,460 | 12/1919 | Lorenz | 83—694 |
| 1,953,030 | 3/1934 | Sterett | 83—600 X |

LEONIDAS VLACHOS, Primary Examiner

U.S. Cl. X.R.

83—700